No. 755,538. Patented March 22, 1904.

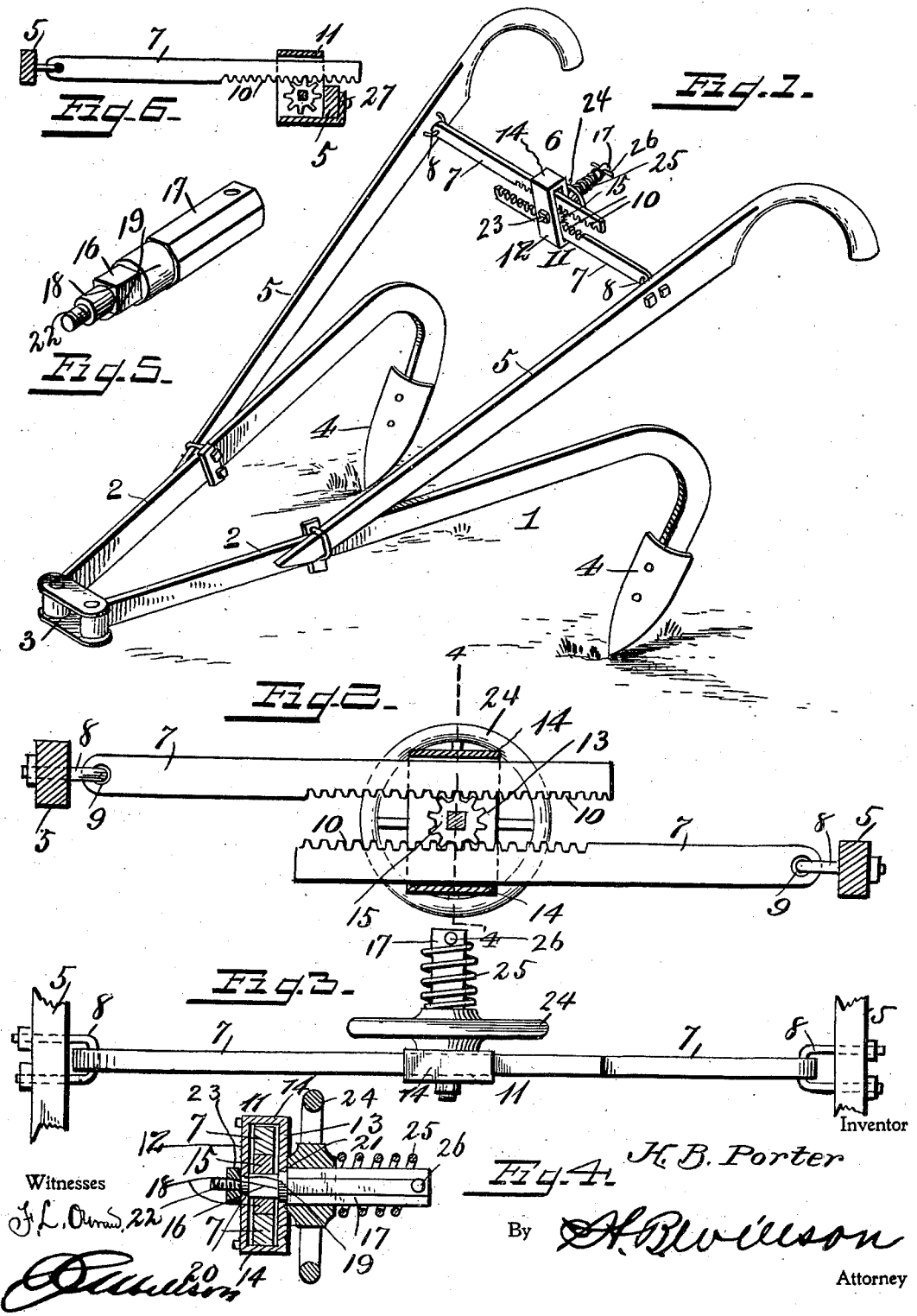

UNITED STATES PATENT OFFICE.

HARRISON B. PORTER, OF BUDA, TEXAS.

CULTIVATOR.

SPECIFICATION forming part of Letters Patent No. 755,538, dated March 22, 1904.

Application filed November 5, 1903. Serial No. 179,975. (No model.)

*To all whom it may concern:*

Be it known that I, HARRISON B. PORTER, a citizen of the United States, residing at Buda, in the county of Hays and State of Texas, have invented certain new and useful Improvements in Cultivators; and I do declare the following to be a full, clear, and exact description of the invention, such as will enable others skilled in the art to which it appertains to make and use the same.

My invention relates to improvements in cultivators, and more particularly to the means for adjusting the cultivator beams or handles laterally to dispose the cultivator implements at any desired distance apart.

The object of my invention is to provide a device of this character which will be simple in construction, durable in use, effective in operation, and comparatively inexpensive to manufacture.

A further object is to provide an adjusting means of the character described which may be readily applied to either an old or a new cultivator and which may be operated while the cultivator is in use.

With these and other objects in view the invention consists of certain novel features of construction, combination, and arrangement of parts, as will be more fully described, and particularly pointed out in the appended claims.

In the accompanying drawings, Figure 1 is a perspective view of a cultivator, showing the application of my invention thereto. Fig. 2 is an enlarged side elevation of the adjusting device. Fig. 3 is a top plan view of the same. Fig. 4 is a transverse sectional view taken on the line 4 4 of Fig. 2. Fig. 5 is a perspective view of the operating-shaft. Fig. 6 is a detail view of a modified form of my invention.

Referring to the drawings by numeral, 1 denotes a walking-cultivator comprising two beams 2, having their front ends pivotally connected at 3 and their rear ends provided with shovels or other implements 4. Each of the beams 2 is provided with an upwardly and rearwardly extending handle 5.

My improved adjusting device, which is denoted by the numeral 6, preferably connects the handles 5 adjacent to their upper ends, as shown in Fig. 1; but, if desired, it may be attached directly to the cultivator-beams 2 or to a vertically-disposed adjustable arch carried by the beams. The device 6 comprises two rack-bars 7, each having one of its ends loosely connected to one of the handles 5 by means of a staple 8 upon the handle engaging an aperture 9 in the end of the rack-bar. The opposite ends of the rack-bars, which are provided upon their opposing edges with rack-teeth 10, project through a connecting guide-frame 11, composed of two plates 12 and 13. Said frame 11 may be an integral casting, as shown, the plates having their ends connected by a web 14, or it may be composed of two separate plates connected and spaced apart by bolts. The rack-teeth 10 on said bars engage a cog-wheel 15 at diametrically opposite points. Said cog wheel or pinion 15 is disposed between the plates 12 and 13 and is secured upon a square or polygonal shaped portion 16 of an operating rod or shaft 17, one end of which is journaled in said plates by providing circular portions 18 and 19 adjacent to the square portion 16, which circular portions 18 and 19 respectively engage circular openings 20 and 21, formed, respectively, in the plates 12 and 13. The portion 19 is preferably of less diameter than the portion 18 to permit it to be easily passed through the opening 20, and the extreme end of said shaft, which projects upon the outside of the plate 13, is screw-threaded, as at 22, to receive a nut 23, which secures the shaft 17 in said frame 11. The opposite end of the shaft 17, which projects upon the outside of the plate 12 and which is preferably hexagonal in cross-section, has slidably mounted upon it a hand operating-wheel 24, which is held in engagement with the outer face of the plate 12 by a coil-spring 25, surrounding said shaft and confined between said wheel 24 and a cross pin or key 26, projecting through an aperture adjacent to the end of said shaft. Owing to the frictional engagement of the wheel with said plate caused by said spring, the shaft 17 will be prevented from casual rotation. If so desired, the inner face of the hub of the wheel 24 and the portion of the plate with which it contacts may be corrugated or serrated in order to increase their frictional engagement.

The operation of my invention is as follows: When it is desired to adjust the implements of the cultivator toward or from each other, the handles 5 are moved laterally by grasping the hand-wheel 24, drawing it away from the plate 12 against the tension of the spring 25 and turning it in the proper direction. The hand-wheel 24 will rotate the shaft 17 and pinion 15, and the latter will move the rack-bars longitudinally toward or from each other, and thus cause the handles 5 to be moved nearer each other or farther apart. As soon as the hand-wheel is released the spring 25 will force it into contact with the plate 12, and thus lock it, the shaft, and the pinion against casual rotation.

In the embodiment of my invention as illustrated in Fig. 6 of the drawings but one rack-bar 7 is used, the guide-frame 11 being secured directly to one of the handles, as at 27. The construction and operation of this form of device are otherwise the same as of that previously described.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a cultivator, the combination with bars or beams pivotally mounted to swing toward or from each other, of a guide-frame, rack-bars connected to the bars or beams and extending through the guide-frame, a shaft in said guide-frame, a pinion in the latter on said shaft, between and engaging the rack-bars to actuate the latter, an operating-wheel slidably mounted on said shaft and frictionally engaging one side of the frame, and a spring bearing against said wheel to create friction between it and the frame, to prevent casual rotation of the shaft, said rack-bars, guide-frame and pinion forming the sole connection between the said bars or beams.

2. In a cultivator, the combination with bars or beams pivotally mounted to swing toward and from each other, of a guide-frame, rack-bars connected to the bars or beams and extending through the guide-frame, a shaft journaled in the guide-frame, a pinion in the latter on said shaft and engaging the rack-bars to actuate the latter, an operating-wheel slidably mounted on the shaft and frictionally engaging one side of the frame, and a coiled extensile spring on the shaft, bearing against one side of the wheel to prevent the casual rotation of the shaft, by the friction of the wheel against the frame, said rack-bars, guide-frame and pinion forming the sole connection between the said bars or beams, substantially as described.

In testimony whereof I have hereunto set my hand in presence of two subscribing witnesses.

HARRISON B. PORTER.

Witnesses:
J. R. CALDWELL,
J. B. WILSON.